April 25, 1967 G. M. FERRIEU 3,316,493

CONTROLLED LINEAR DETECTOR

Filed June 30, 1964 2 Sheets-Sheet 1

United States Patent Office 3,316,493

Patented Apr. 25, 1967

3,316,493
CONTROLLED LINEAR DETECTOR

Gilbert Marcel Ferrieu, Route du Port, Locquemeau, France

Filed June 30, 1964, Ser. No. 379,186
Claims priority, application France, Aug. 20, 1963, 945,131
5 Claims. (Cl. 329—101)

The present invention relates to a detector for detecting alternating electrical signals of any waveform, in particular to a controlled linear detector.

It is well known that where the input signal is of sufficiently high amplitude (voltage) a diode, for example a semiconductor diode, may be considered as having good linear properties of detection and good stability. However, where low amplitude signals are concerned, a diode of this type operates in that region of its current-voltage characteristic at which a sharp knee occurs so that the linearity is poor and this factor limits the minimum acceptable voltage level.

The object of the invention is to make it possible to detect very low level signals throughout a wide frequency band and to achieve high linearity detection in conjunction with a high input signal range.

A feature of the detector proposed in accordance with the invention is that it comprises a gating circuit and an amplifier-limiter to which the signals to be detected are applied in parallel, said gating circuit being blocked or rendered conductive by the said amplifier-limiter in accordance with polarity of the said signals.

Another feature of the proposed detector is that the blocking or unblocking signals applied by the said amplifier-limiter in accordance with the polarity of the signals to be detected, to the said gating circuit, fall within a limited range in such a way that the said gating circuit presents a resistance to these signals (the signals to be detected) which has a very high or very low value all in accordance with the signal polarity, these two resistance values being practically constant and independent of the amplitude and frequency of the said signals, which gives high linearity in detection.

Still another feature of the said amplifier-limiter is that it embodies a negative feedback circuit the impedance of which can be varied as a function of the voltage amplitude of the signals to be detected.

In accordance with the invention said amplifier-limiter has a negative feedback circuit comprising two diodes connected in parallel in opposite senses, in such a manner that its gain is very high for low level signals applied to its input and very low for high level signals, since the latter cause the unblocking of one or other of the said diodes and thus produce very strong negative feedback opposing saturation and preventing the resultant distortion.

Next to these features, a detector of the proposed type can produce at its output detected signals whose amplitude is proportional to the amplitude of the alternating signals applied to its input, this for example through a frequency band extending from 200 to 40,000 cycles per second, and for an effective signal voltage amplitude of between 1 millivolt and 2.5 volts (or for an input signal level range of more than 60 decibels).

The invention will be better understood from an examination of the following description and the attached drawings. In the drawings.

Figure 4:
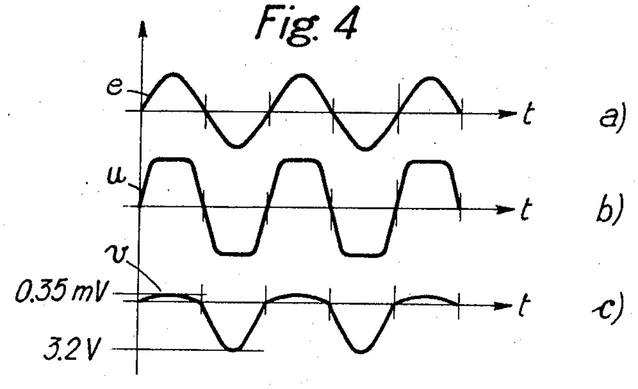
Figure 5:
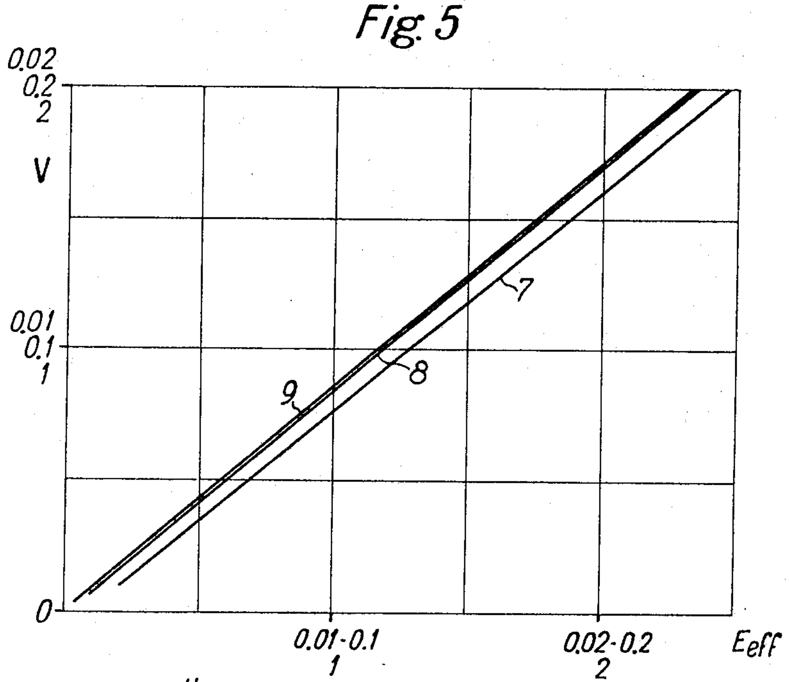
Figure 3:
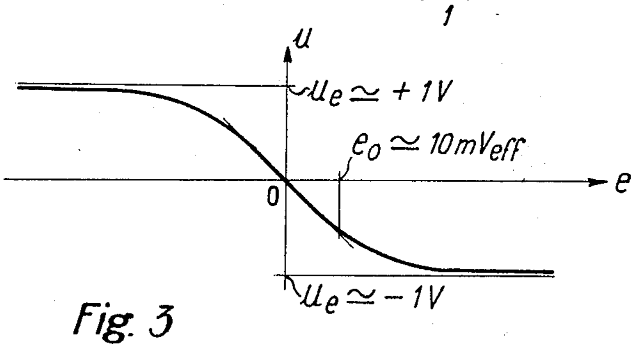

FIGURE 3 portrays the variation in the output voltage from the amplifier-limiter as a function of the input voltage;

FIGURE 4 shows the shape of the signals at different points in the proposed detector;

FIGURE 5 is a diagram illustrating the performance of the detector.

Figure 1:
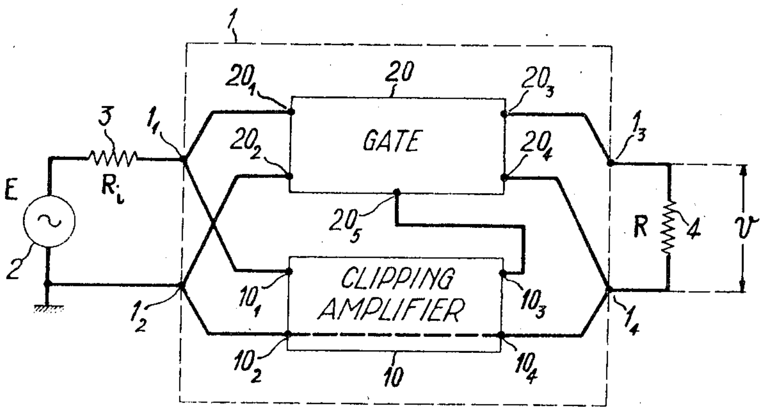
FIGURE 1 is a circuit diagram of a detector of the type proposed in accordance with the invention.
Figure 2:
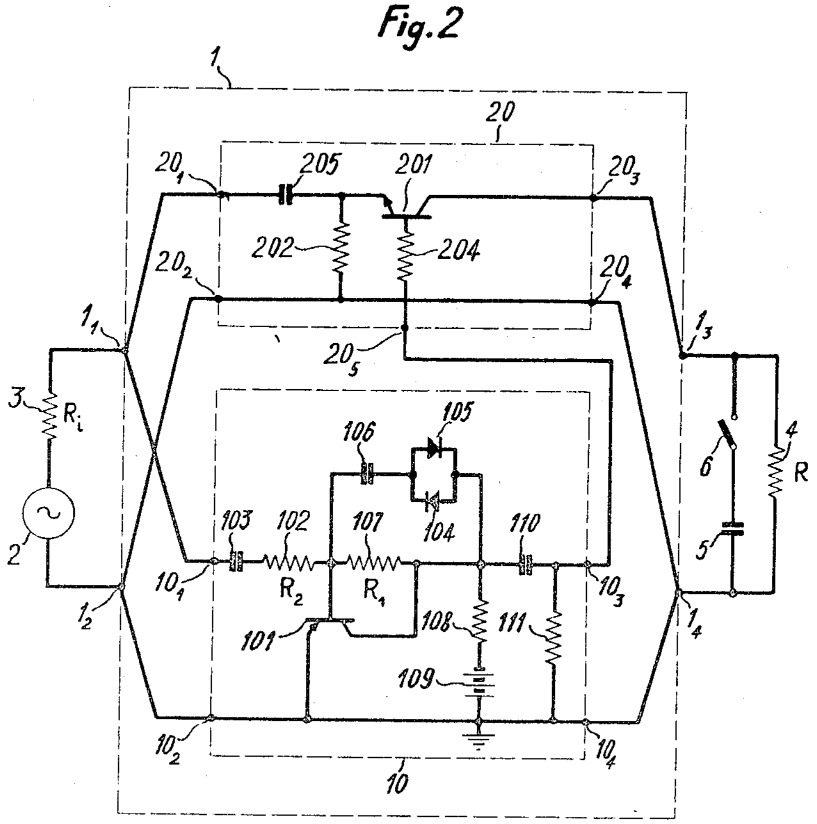
FIGURE 2 is a non-limitative example of one embodiment of a detector of the type illustrated in circuit diagram form in FIGURE 1.

The detector 1, shown as a block circuit diagram in FIGURE 1 and in full circuit diagram form in FIGURE 2, is constituted by an amplifier-limiter 10 and a gating circuit 20 whose input terminals $\mathbf{10_1}$, $\mathbf{10_2}$ and $\mathbf{20_1}$, $\mathbf{20_2}$ are connected in parallel with the terminals $\mathbf{1_1}$, $\mathbf{1_2}$ of a source 2 of signals to be detected, the internal resistance of which source is $R_i$ (the resistance is represented by a resistor 3). The amplifier 10, through the medium of a connection between its output terminal $\mathbf{10_3}$ and the control terminal $\mathbf{20_5}$ of the gating circuit 10, applies to this gating circuit signal which block or unblock it in accordance with the polarity of the input signals and in phase with these same signals. The gating circuit 20, of classic type, opens or closes very rapidly in accordance with the polarity of the control signal applied to the terminal $\mathbf{20_5}$ and therefore presents at its input terminals $\mathbf{20_1}$, $\mathbf{20_2}$ and its output terminals $\mathbf{20_3}$, $\mathbf{20_4}$, which latter terminals are connected to the terminals $\mathbf{1_3}$, $\mathbf{1_4}$ of a load resistor 4 (resistance value R), a very low or very high resistance $R_a$ or $R_b$ respectively, depending upon the polarity of the applied signal; both these resistance values are more or less constant and independent of the amplitude and frequency of the signals to be detected so that the linearity of detection is excellent.

The amplifier-limiter 10 comprises a transistor 101, for example of p-n-p type, the base of which is connected to the input terminal $\mathbf{10_1}$ through a capacitor 103 in series with a resistor 102 the value of whose resistance is $R_2$, the emitter being connected to the earthed input terminal $\mathbf{10_2}$. The collector of the transistor 101 is polarized from a D.C. voltage source 109 across a resistor 108, and is connected to the base via a negative feedback circuit consisting of a resistor 107, the value of whose resistance is extremely high, in parallel with a circuit comprising a capacitor 106 connected in series with two identical diodes 104, 105, e.g. of the silicon point-contact type, these diodes themselves being in an opposed parallel arrangement. The collector of the transistor 101 is also connected via a capacitor 110 to the output terminal $\mathbf{10_3}$ the mean potential of which is set to zero by means of a resistor 111 connecting it to the terminal $\mathbf{10_4}$ and thus to ground.

The capacitors 103 and 110 which isolate the direct current source 109 from the input and output circuits of the amplifier-limiter 10, have negligible impedance at the frequencies of the signals to be detected, as also has the capacitor 106 in the feedback circuit.

FIGURE 3 illustrates the behavior of the instantaneous output voltage $u$ from the amplifier-limiter 10 as a function of the instantaneous input voltage $e$ supplied to it.

Where the instantaneous voltage $e$ is below a certain voltage level $e_0$, the output voltage $u$ increases linearly with $e$, following the approximate law:

$$u = eR_1/R_2$$

If the instantaneous voltage $e$ is greater than $e_0$, the voltage $u$ increases at a slower rate than $e$. In fact, if $e$ becomes very large the corresponding value of the voltage $u$ cannot in practice exceed a limiting value $u_e$ which is related to the voltage at which the current-voltage characteristic for the diodes 104, 105 exhibits a knee (occurring at about 1 volt in the case of silicon diodes).

The amplifier-limiter 10 thus operates with virtually zero feedback and high gain low level input signals. On the other hand, for high amplitude signals, the negative feedback is very high, thus counteracting saturation and cutting out the resultant distortion.

Since the diodes 104, 105 merely exchange roles when the sign of the voltage $e$ changes, the gain of the amplifier-limiter 10 is independent of the polarity of the instantaneous input voltage $e$ and the limiting action does not modify the means potential of the signals in relation to the input means. The result of this is that the zero points in the output signal are accurately synchronized and are cophasal with the signals applied to the input of the amplifier 10.

The diagrams ($a$) and ($b$) of FIGURE 4 respectively illustrate the behavior of the signals $e$ and $u$, respectively at input and output of the amplifier-limiter 10.

The heart of the gating circuit 20 is an n-p-n transistor 201 whose emitter is connected on the one hand through a capacitor 205 to the input terminal $\mathbf{20_1}$ and, on the other through a resistor 202 to the input terminal $\mathbf{20_2}$ which is grounded. The collector of the transistor 201 is connected to the output terminal $\mathbf{20_3}$ of the gate 20, which terminal is itself connected to the terminal $\mathbf{1_3}$ of the load resistor 4. The base of the transistor 201 is connected through a resistor 204 to the control terminal $\mathbf{20_5}$, itself connected to the output terminal $\mathbf{10_3}$ of the amplifier-limiter 10.

By applying a suitable positive potential to the terminal $\mathbf{20_5}$, the transistor 201 is driven into saturation and presents negligible resistance to the current to be detected. When a voltage of inverse polarity is applied by the amplifier 10 to the transistor 201, the latter block and opposes the passage of the signal current to be detected.

The transistor 201 is so selected that the resistance which it offers to the passage of the signal current to be detected is as low as possible in the forward direction and as high as possible in the reverse direction. A particularly suitable transistor for this purpose is the symmetrical type, the characteristics of which have been discussed for example in the article by Robert B. Trousdale entitled "The symmetrical transistor as a bilateral switching element" published in the American magazine "Communication and Electronics," September 1956, No. 26, pages 400 to 403.

The diagram ($c$) of FIGURE 4 shows the shape of the output signal $u$ from the detector of FIG. 1.

By way of a non-limitative example, typical values are given below for the components in a detector, of the type proposed in accordance with the invention, which has operated satisfactorily; also given are operating figures.

*Specifications*

Amplifier-limiter 10—
- Resistor 102: $R_2$=2,700 ohms.
- Resistor 107: $R_1$=180,000 ohms.
- Resistor 108: 8,200 ohms.
- Resistor 111: 100,000 ohms.
- Capacitors 103, 106, 110: 1 microfarad.
- Diodes 104, 105: silicon point-contact type $15P_2$.
- Transistor 101: p-n-p type 2N396.
- Source 109: −24 volts.

Gating circuit 20—
- Resistor 202: 1,000 ohms.
- Resistor 204: 47,000 ohms.
- Capacitor 205: 1 microfarad.
- Transistor 201: commercial type 2N428 or 2N1385.
- Resistance presented by the gate 20:
- Open: $R_a$=20 ohms.
- Closed: $R_b$=10 megohms.

Source 2—
- Frequency: 1,000 c./s.
- Internal resistance (resistor 3) $R$=5 ohms.

Load resistor 4—1,000 ohms.

*Operating figures*

*The case in which the signal to be detected is of low amplitude.*—The source 2, of internal resistance $R_i$=5 ohms, has an effective electromotive force $E_{eff}$ of 1 millivolt.

The gain of the amplifier-limiter 10 is approximately:

$$A \approx (R_1/R_2) \approx 66$$

The effective voltage on the base electrode of the transistor 201 of the gating circuit 20 is equivalent to 66 millivolts.

The peak voltage of the detected signal is 0.8 millivolt for the half cycle passed and 0.35 millivolt for the blocked half-cycle.

*The case in which the signal to be detected is of high amplitude.*—The source 2 produces an effective electromotive source $E_{eff}$ of 2.5 volts.

The gain of the amplifier-limiter 10 is approximately equal to: $A$=0.28 (for the signal peak).

The effective voltage on the base electrode of the transistor 201 in the gating circuit is equivalent to 66 millivolts.

The peak voltage of the detected signal is 3.2 volts for the half cycle passed and 0.35 millivolt for the blocked half cycle.

*Linearity*

FIGURE 5 reproduces the mean detected voltage V picked up across the terminals $\mathbf{1_3}$, $\mathbf{1_4}$ of the load resistor 4, the voltage being plotted as a function of the electromotive force $E_{eff}$ applied by the source 2 across the input terminals $\mathbf{1_1}$, $\mathbf{1_2}$ of the detector 1.

As can be seen, the curves are practically straight lines. The curve 7 relates to the interval $0<E_{eff}<0.025$ volt. The curves 8 and 9 relate respectively to the intervals $0.025<E_{eff}<0.25$ volt and 0.25 volt$<E_{eff}<2.5$ volts.

Returning to FIGURE 2, it will be noticed that a capacitor 5 is connected in series with a switch 6 across the output terminals $\mathbf{1_3}$, $\mathbf{1_4}$ of the detector 1. By placing the capacitor 5 in circuit, the mean value of a modulated or unmodulated input signal can be measured.

If the frequency of the modulated A.C. signal is $\Omega$ radians per second and $\omega$ is the frequency in radians per second of the modulating signal, the capacitance C of the capacitor 5 should satisfy the well-known expression:

$$\omega << 1/RC << \Omega$$

In the absence of any modulation, a direct current voltage will appear across the output terminals $\mathbf{1_3}$, $\mathbf{1_4}$ of the detector, equivalent in amplitude to $2/\pi$ times the peak amplitude of the output signal.

What is claimed is:

1. A controlled linear detector for alternating current signals comprising a gate circuit having a signal input, a control input and an output, said gate circuit having either a passing or a non-passing condition according to the polarity of a control signal applied to said control input, a clipping amplifier having a signal input and a clipped signal output, said clipped signal output delivering a substantially constant amplitude signal the polarity of which changes with that of the signal applied to said signal input of said clipping amplifier, means for applying said alternating current signals to both said signal inputs, means for applying signals from said clipped signal output as control signals to said control input of said gate circuit, and means for applying signals received at said signal output of said gate circuit to a utilization circuit.

2. A controlled linear detector as claimed in claim 1, in which said gate circuit comprises a transistor having a base electrode, a collector and an emitter, a signal input circuit connected between said emitter and a constant potential point, a signal output circuit connected between said collector and said constant potential point, and a control input circuit including a resistor connecting said base electrode to a control terminal, said control input circuit having two terminals one of which is said control terminal and the other of which is connected with said constant potential point.

3. A controlled linear detector as claimed in claim 2, in which said clipping amplifier comprises a further transistor having a base electrode, a collector and an emitter, an input circuit connected between said base electrode and emitter of said further transistor, connection means between latter said emitter and said constant potential point, and an output circuit connected between said collector of said further transistor and said constant potential point; said output circuit of said further transistor being operatively connected with said control input of said gate circuit.

4. A controlled linear detector as claimed in claim 3, in which a non-linear negative feedback circuit is connected between said signal input and output circuits of said clipping amplifier, and in which said feedback circuit includes a non-linear resistance means, the value of which decreases with an increasing voltage applied thereto.

5. A controlled linear detector as claimed in claim 4, in which said non-linear resistance means consists of two semiconductor diodes in parallel connection with opposite conduction directions.

References Cited by the Examiner

UNITED STATES PATENTS

| | | | |
|---|---|---|---|
| 2,540,512 | 2/1951 | Crosby | 329—192 X |
| 2,941,070 | 6/1960 | Barry | 325—319 X |
| 3,188,571 | 6/1965 | Michael | 325—319 X |
| 3,193,773 | 7/1965 | Uglum et al. | 330—10 |
| 3,223,936 | 12/1965 | Cook | 330—110 |

ROY LAKE, *Primary Examiner.*

ALFRED L. BRODY, *Examiner.*